United States Patent
Liu

(10) Patent No.: US 10,103,788 B2
(45) Date of Patent: Oct. 16, 2018

(54) METHOD FOR REDUCING SELF-INTERFERENCE SIGNAL IN COMMUNICATIONS SYSTEM, AND APPARATUS

(71) Applicant: Huawei Technologies Co., Ltd., Shenzhen (CN)

(72) Inventor: Sheng Liu, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 133 days.

(21) Appl. No.: 15/167,365

(22) Filed: May 27, 2016

(65) Prior Publication Data

US 2016/0277166 A1 Sep. 22, 2016

Related U.S. Application Data

(63) Continuation of application No. PCT/CN2013/088222, filed on Nov. 29, 2013.

(51) Int. Cl.
*H04B 7/015* (2006.01)
*H04W 4/80* (2018.01)
(Continued)

(52) U.S. Cl.
CPC .............. *H04B 7/015* (2013.01); *H04B 1/525* (2013.01); *H04L 5/0048* (2013.01);
(Continued)

(58) Field of Classification Search
CPC .................................................. H04B 7/015
See application file for complete search history.

(56) References Cited

U.S. PATENT DOCUMENTS 5,748,677 A * 5/1998 Kumar ............... H04J 1/12
 375/229
8,224,242 B2 * 7/2012 Chang ............... H04B 7/15585
 455/39

(Continued)

FOREIGN PATENT DOCUMENTS

CN 103095351 A 5/2013
CN 103338172 A 10/2013
(Continued)

OTHER PUBLICATIONS

Li, N., et al., "Digital Interference Cancellation in Single Channel, Full Duplex Wireless Communication," 8th International Conference on Wirless Communications, Networking and Mobile Computing, Sep. 21-23, 2012, 4 pages.

(Continued)

*Primary Examiner* — Jason E Mattis
(74) *Attorney, Agent, or Firm* — Slater Matsil, LLP

(57) ABSTRACT

Embodiments provide a method for reducing a self-interference signal in a communications system, and an apparatus. The method includes: sending a sounding signal; receiving an echo signal, where the echo signal includes a near-field reflected signal corresponding to the sounding signal. The method also includes separating the near-field reflected signal corresponding to the sounding signal from the echo signal, and determining a near-field reflection channel parameter according to the near-field reflected signal. The method also includes determining a reconstructed near-field reflected self-interference signal based on the near-field reflection channel parameter, and subtracting the reconstructed near-field reflected self-interference signal from a received second communication signal.

17 Claims, 5 Drawing Sheets

(51) Int. Cl.
  *H04L 25/03* (2006.01)
  *H04B 1/525* (2015.01)
  *H04L 5/00* (2006.01)
  *H04W 72/04* (2009.01)

(52) U.S. Cl.
  CPC ......... *H04L 25/03006* (2013.01); *H04W 4/80* (2018.02); *H04W 72/0446* (2013.01)

(56) References Cited

U.S. PATENT DOCUMENTS

| | | |
|---|---|---|
| 2005/0190822 A1 | 9/2005 | Fujii et al. |
| 2010/0029350 A1 | 2/2010 | Zhang |
| 2010/0285735 A1 | 11/2010 | Gore et al. |
| 2011/0143655 A1* | 6/2011 | Ahn .................. H04B 7/15542 455/9 |
| 2012/0201153 A1 | 8/2012 | Bharadia et al. |
| 2013/0089021 A1 | 4/2013 | Gaal et al. |
| 2013/0114468 A1 | 5/2013 | Hui et al. |
| 2013/0163457 A1* | 6/2013 | Kim ...................... H04W 24/02 370/252 |
| 2013/0286903 A1 | 10/2013 | Khojastepour et al. |
| 2015/0003271 A1* | 1/2015 | Park ...................... H04L 5/0091 370/252 |

FOREIGN PATENT DOCUMENTS

| | | |
|---|---|---|
| CN | 103458424 A | 12/2013 |
| JP | 2001186073 A | 7/2001 |
| JP | 2004328286 A | 11/2004 |
| JP | 2005236626 A | 9/2005 |
| JP | 2012527177 A | 11/2012 |
| RU | 2000660 C1 | 9/1993 |

OTHER PUBLICATIONS

Liu, C., et al., "A New Method of Single-echo-Super-resolution Based on Adaptive Regularizarion Algorith," Science in China (Series E), Apr. 1999, 16 pages.

* cited by examiner

US 10,103,788 B2

METHOD FOR REDUCING SELF-INTERFERENCE SIGNAL IN COMMUNICATIONS SYSTEM, AND APPARATUS

CROSS-REFERENCE TO RELATED APPLICATIONS

This application is a continuation of International Application No. PCT/CN2013/088222, filed on Nov. 29, 2013, which is hereby incorporated by reference in its entirety.

TECHNICAL FIELD

Embodiments relate to the field of communications technologies, and in particular, to a method for reducing a self-interference signal in a communications system, and an apparatus.

BACKGROUND

In a wireless communications system such as a mobile cellular communications system, a wireless local area network (WLAN), and fixed wireless access (FWA), a communications node such as a base station (BS), an access point (AP), a relay station (RS), or user equipment (UE) usually has a capabilities of sending a signal of the communications node and receiving a signal from another communications node. Because a wireless signal is greatly attenuated on a wireless channel, and compared with a signal sent by the communications node, when a signal from a communications transmit end is very weak when arriving at a receive end. For example, a difference between a power for receiving a signal and a power for sending a signal by a communications node in a mobile cellular communications system can reach 80 dB to 120 dB or can be even larger. Therefore, to avoid interference (such interference is referred to as self-interference) to a received signal of a communications node from a sending signal of the communications node, transmission and reception of a wireless signal are distinguished by using different frequency bands or time periods. For example, in frequency division duplex (FDD), communication in transmission and reception are performed by using different frequency bands separated by a certain guard band. In time division duplex (TDD), communication in transmission and reception are performed by using different time periods separated by a guard interval. The guard band in the FDD system and the guard interval in the TDD system are both for the purpose of ensuring that reception and transmission are thoroughly separated, thereby avoiding interference to reception from transmission.

In the wireless full duplex technology, reception and transmission operations can be simultaneously performed on a same wireless channel. Theoretically, the spectral efficiency of the wireless full duplex technology is twice as high as that of the FDD technology or the TDD technology. However, because there is no guard band or guard interval, a transmitted signal of a communications node that supports wireless full duplex may result in interference to a received signal of the communications node, causing that the communications node cannot correctly receive a wanted signal. Self-interference includes a near-field reflected self-interference signal on a near-field reflection channel and a far-field reflected self-interference signal on a far-field reflection channel. The near-field reflected self-interference signal typically corresponds to a near-field reflection path of 0.3 m to 60 m, and a multi-path transmission delay is 1 ns to 400 ns. Because propagation environments around a transceiving antenna change slightly, a delay of a component of the near-field reflected self-interference signal changes slightly and slowly with time. The near-field reflected self-interference signal is a self-interference component that is the most difficult to effectively cancel in a wireless full duplex system, and reasons are as follows: Because a propagation distance of a near-field multi-path echo signal is relatively short, a propagation delay difference between multiple paths is very small, when a communication signal of a normal bandwidth (10 MHz to 40 MHz) is used, the near-field reflected self-interference signal cannot be effectively recognized and reconstructed, and effective interference cancellation cannot be implemented. For example, a difference between delays of two reflectors whose straight-line propagation distances from the communications node have a difference of 3 meters is 20 ns, and distinguishing is very difficult. Due to a relatively large multi-path delay difference, a component of a far-end reflected self-interference signal can be recognized when a signal having a normal bandwidth is used, thereby implementing effective cancellation. Therefore, how to determine a near-field reflection channel parameter that can be used to reconstruct a near-field reflected self-interference signal is a key issue for cancelling the near-field reflected self-interference signal.

SUMMARY

Embodiments provide a method for reducing a self-interference signal in a communications system, and an apparatus, which can determine a near-field reflection channel parameter used to estimate a near-field reflected self-interference signal, and reduce near-field self-interference signals in received signals by using the near-field reflection channel parameter.

According to a first aspect, an embodiment provides an apparatus, where the apparatus includes: a sending unit, configured to send a sounding signal and a first communication signal, where the sounding signal is sent in a manner of being superimposed on the first communication signal, and a power used to send the sounding signal is less than a power used to send the first communication signal; a receiving unit, configured to receive an input signal, where the input signal includes an echo signal and a second communication signal sent by another apparatus, and the echo signal includes a near-field reflected signal corresponding to the sounding signal; a signal separation unit, configured to separate the near-field reflected signal from the echo signal; a processing unit for a near-field reflected self-interference signal, configured to determine a near-field reflection channel parameter according to the near-field reflected signal; and a cancellation unit for a near-field reflected self-interference signal, configured to determine a reconstructed near-field reflected self-interference signal based on the near-field reflection channel parameter, and subtract the reconstructed near-field reflected self-interference signal from the second communication signal.

With reference to the first aspect, in a first possible implementation manner, the sending unit is specifically configured to send the sounding signal in a transmit timeslot in a sounding timeslot, and stop sending the sounding signal in an idle timeslot in the sounding timeslot, where the idle timeslot includes a first silent timeslot and a second silent timeslot.

With reference to the first aspect or the first possible implementation manner, in a second possible implementation manner, the sending unit is specifically configured to send the sounding signal by using a bandwidth that is greater than or equal to a bandwidth used to send the first communication signal.

With reference to the second possible implementation manner, in a third possible implementation manner, when the sending unit sends the sounding signal by using a bandwidth that is greater than the bandwidth used to send the first communication signal, the processing unit for a near-field reflected self-interference signal is specifically configured to perform matched filtering on the near-field reflected signal, to obtain a filtered near-field reflected signal, and determine the near-field reflection channel parameter according to the filtered near-field reflected signal.

With reference to the second possible implementation manner, in a fourth possible implementation manner, when the sending unit sends the sounding signal by using a bandwidth that is greater than the bandwidth used to send the first communication signal, the processing unit for a near-field reflected self-interference signal is specifically configured to perform matched filtering on multiple near-field reflected signals, to obtain multiple filtered near-field reflected signals, determine an average value of the multiple filtered near-field reflected signals, and determine the near-field reflection channel parameter according to the average value of the multiple filtered near-field reflected signals; or the processing unit for a near-field reflected self-interference signal is specifically configured to determine an average near-field reflected signal corresponding to multiple near-field reflected signals, perform matched filtering on the average near-field reflected signal, to obtain a filtered average near-field reflected signal, and determine the near-field reflection channel parameter according to the filtered average near-field reflected signal.

With reference to the second possible implementation manner, in a fifth possible implementation manner, when the sending unit sends the sounding signal by using a bandwidth that is equal to the bandwidth used to send the first communication signal, the processing unit for a near-field reflected self-interference signal is specifically configured to determine the near-field reflection channel parameter by using a super-resolution delay algorithm.

With reference to the first aspect or any one of the foregoing possible implementation manners, in a sixth possible implementation manner, when the apparatus supports multiple-input multiple-output MIMO, the sending unit is specifically configured to separately send the sounding signal by using multiple antennas of the apparatus, where timeslots in which the multiple antennas separately send the sounding signal are mutually staggered.

With reference to the first aspect or any one of the foregoing possible implementation manners, in a seventh possible implementation manner, the sending unit is specifically configured to send the sounding signal by using a timeslot that is staggered with a timeslot used for sending a sounding signal by an adjacent apparatus supporting wireless full duplex.

With reference to the first aspect or any one of the first possible implementation manner to the fifth possible implementation manner, in an eighth possible implementation manner, the sending unit is specifically configured to send the sounding signal by using M random sounding timeslots, where M is an average quantity of near-field reflected signals that correspond to the sounding signal and are accumulated by the apparatus supporting wireless full duplex within a coherent accumulation time for receiving the echo signal.

According to a second aspect, an embodiment provides an apparatus. The apparatus includes: a transmit antenna, configured to send a sounding signal and a first communication signal, where the sounding signal is sent in a manner of being superimposed on the first communication signal, and a power used to send the sounding signal is less than a power used to send the first communication signal. The apparatus also includes a receive antenna, configured to receive an echo signal, where the echo signal includes a near-field reflected signal corresponding to the sounding signal. The apparatus also includes a signal separator, configured to separate the near-field reflected signal from the echo signal. The apparatus also includes a processor for a near-field reflected self-interference signal, configured to determine a near-field reflection channel parameter according to the near-field reflected signal. The apparatus also includes a canceller for a near-field reflected self-interference signal, configured to determine a reconstructed near-field reflected self-interference signal based on the near-field reflection channel parameter, and subtract the reconstructed near-field reflected self-interference signal from a second communication signal.

With reference to the second aspect, in a first possible implementation manner, the transmit antenna is specifically configured to send the sounding signal in a transmit timeslot in a sounding timeslot, and stop sending the sounding signal in an idle timeslot in the sounding timeslot, where the idle timeslot includes a first silent timeslot and a second silent timeslot.

With reference to the second aspect or the first possible implementation manner, in a second possible implementation manner, the transmit antenna is specifically configured to send the sounding signal by using a bandwidth that is greater than or equal to a bandwidth used to send the first communication signal.

With reference to the second possible implementation manner, in a third possible implementation manner, when the transmit antenna sends the sounding signal by using a bandwidth that is greater than the bandwidth used to send the first communication signal, the processor for a near-field reflected self-interference signal is specifically configured to perform matched filtering on the near-field reflected signal, to obtain a filtered near-field reflected signal, and determine the near-field reflection channel parameter according to the filtered near-field reflected signal.

With reference to the second possible implementation manner, in a fourth possible implementation manner, when the transmit antenna sends the sounding signal by using a bandwidth that is greater than the bandwidth used to send the first communication signal, the processor for a near-field reflected self-interference signal is specifically configured to perform matched filtering on multiple near-field reflected signals, to obtain multiple filtered near-field reflected signals, determine an average value of the multiple filtered near-field reflected signals, and determine the near-field reflection channel parameter according to the average value of the multiple filtered near-field reflected signals; or the processor for a near-field reflected self-interference signal is specifically configured to determine an average near-field reflected signal corresponding to multiple near-field reflected signals, perform matched filtering on the average near-field reflected signal, to obtain a filtered average near-field reflected signal, and determine the near-field reflection channel parameter according to the filtered average near-field reflected signal.

With reference to the second possible implementation manner, in a fifth possible implementation manner, when the transmit antenna sends the sounding signal by using a bandwidth that is equal to the bandwidth used to send the first communication signal, the processor for a near-field reflected self-interference signal is specifically configured to determine the near-field reflection channel parameter by using a super-resolution delay algorithm.

With reference to the second aspect or any one of the foregoing possible implementation manners, in a sixth possible implementation manner, when the apparatus supports multiple-input multiple-output MIMO, the transmit antenna is specifically configured to separately send the sounding signal by using multiple antennas of the apparatus, where timeslots in which the multiple antennas separately send the sounding signal are mutually staggered.

With reference to the second aspect or any one of the foregoing possible implementation manners, in a seventh possible implementation manner, the transmit antenna is specifically configured to send the sounding signal by using a timeslot that is staggered with a timeslot used for sending a sounding signal by an adjacent apparatus supporting wireless full duplex.

With reference to the second aspect or any one of the first possible implementation manner to the fifth possible implementation manner, in an eighth possible implementation manner, the transmit antenna is specifically configured to send the sounding signal by using M random sounding timeslots, where M is an average quantity of near-field reflected signals that correspond to the sounding signal and are accumulated by the apparatus supporting wireless full duplex within a coherent accumulation time for receiving the echo signal.

According to a third aspect, an embodiment provides a method for reducing a self-interference signal in a communications system, where the method is performed by an apparatus supporting wireless full duplex. The method includes: sending a sounding signal and a first communication signal, where the sounding signal is sent in a manner of being superimposed on the first communication signal, and a power used to send the sounding signal is less than a power used to send the first communication signal. The method also includes receiving an input signal, where the input signal includes an echo signal and a second communication signal that is received from another apparatus, and the echo signal includes a near-field reflected signal corresponding to the sounding signal. The method also includes separating the near-field reflected signal from the echo signal. The method also includes determining a near-field reflection channel parameter according to the near-field reflected signal. The method also includes determining a reconstructed near-field reflected self-interference signal based on the near-field reflection channel parameter, and subtracting the reconstructed near-field reflected self-interference signal from the second communication signal.

With reference to the third aspect, in a first possible implementation manner, the sending a sounding signal includes: transmitting the sounding signal in a transmit timeslot in a sounding timeslot; and the method further includes: stopping transmitting the sounding signal in an idle timeslot in the sounding timeslot, where the idle timeslot includes a first silent timeslot and a second silent timeslot.

With reference to the first possible implementation manner, in a second possible implementation manner, duration of the first silent timeslot is equal to a maximum multi-path delay of a near-field reflection channel, a value of the second silent timeslot enables a delay of an echo multi-path component to exceed a sum of the duration of the first silent timeslot and duration of the second silent timeslot, and a power of the echo multi-path component is less than a preset threshold.

With reference to the first aspect or any one of the foregoing possible implementation manners, in a third possible implementation manner, the sending a sounding signal and a first communication signal includes: sending the sounding signal by using a bandwidth that is greater than or equal to a bandwidth used to send the first communication signal.

With reference to the third possible implementation manner, in a fourth possible implementation manner, when a bandwidth used to send the sounding signal is greater than the bandwidth used to send the first communication signal, the determining a near-field reflection channel parameter according to the near-field reflected signal includes: performing matched filtering on the near-field reflected signal, to obtain a filtered near-field reflected signal, and determining the near-field reflection channel parameter according to the filtered near-field reflected signal.

With reference to the third possible implementation manner, in a fifth possible implementation manner, when a bandwidth used to send the sounding signal is greater than the bandwidth used to send the first communication signal, the determining a near-field reflection channel parameter according to the near-field reflected signal includes: performing matched filtering on multiple near-field reflected signals, to obtain multiple filtered near-field reflected signals, determining an average value of the multiple filtered near-field reflected signals, and determining the near-field reflection channel parameter according to the average value of the multiple filtered near-field reflected signals; or determining an average near-field reflected signal corresponding to multiple near-field reflected signals, performing matched filtering on the average near-field reflected signal, to obtain a filtered average near-field reflected signal, and determining the near-field reflection channel parameter according to the filtered average near-field reflected signal.

With reference to the third possible implementation manner, in a sixth possible implementation manner, when a bandwidth used to send the sounding signal is equal to the bandwidth used to send the first communication signal, the determining a near-field reflection channel parameter according to the near-field reflected signal includes: determining the near-field reflection channel parameter by using a super-resolution delay algorithm.

With reference to the third aspect or any one of the foregoing possible implementation manners, in a seventh possible implementation manner, when the apparatus supports multiple-input multiple-output MIMO, the sending a sounding signal includes: separately sending the sounding signal by using multiple antennas of the apparatus, where timeslots in which the multiple antennas separately send the sounding signal are mutually staggered.

With reference to third aspect or any one of the foregoing possible implementation manners, in an eighth possible implementation manner, the sending a sounding signal includes: sending the sounding signal by using a timeslot that is staggered with a timeslot used for sending a sounding signal by an adjacent apparatus supporting wireless full duplex.

With reference to the third aspect or any one of the first possible implementation manner to the sixth possible implementation manner, in a ninth possible implementation manner, the sending a sounding signal and a first communication signal includes: sending the sounding signal by using M random sounding timeslots, where M is an average quantity of near-field reflected signals that correspond to the sounding signal and are accumulated by the apparatus supporting wireless full duplex within a coherent accumulation time for receiving the echo signal.

According to the embodiments, an apparatus supporting wireless full duplex can transmit a sounding signal, determine, by separating a near-field reflected signal corresponding to the sounding signal, a near-field reflection channel parameter corresponding to the near-field reflected signal, determine a reconstructed near-field reflected self-interference signal by using the near-field reflection channel parameter, and subtract the reconstructed near-field reflected self-interference signal from a near-field reflected self-interference signal in a received second communication signal. This can effectively reduce a near-field reflected self-interference signal in received signals.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, technical solutions in the embodiments of the present invention may be applied to a wireless full duplex system. A communications node such as user equipment and a base station provided in the embodiments of the present invention supports the wireless full duplex system.

User equipment (UE), may also be referred to as a mobile terminal (MT), mobile user equipment, and the like, may communicate with one or more core networks by using a radio access network (RAN). The user equipment may be a mobile terminal, such as a mobile phone (which is also referred to as a "cellular" phone) and a computer with a mobile terminal. For example, the user equipment may be a portable, pocket-sized, handheld, computer built-in, or in-vehicle mobile apparatus.

Figure 1:
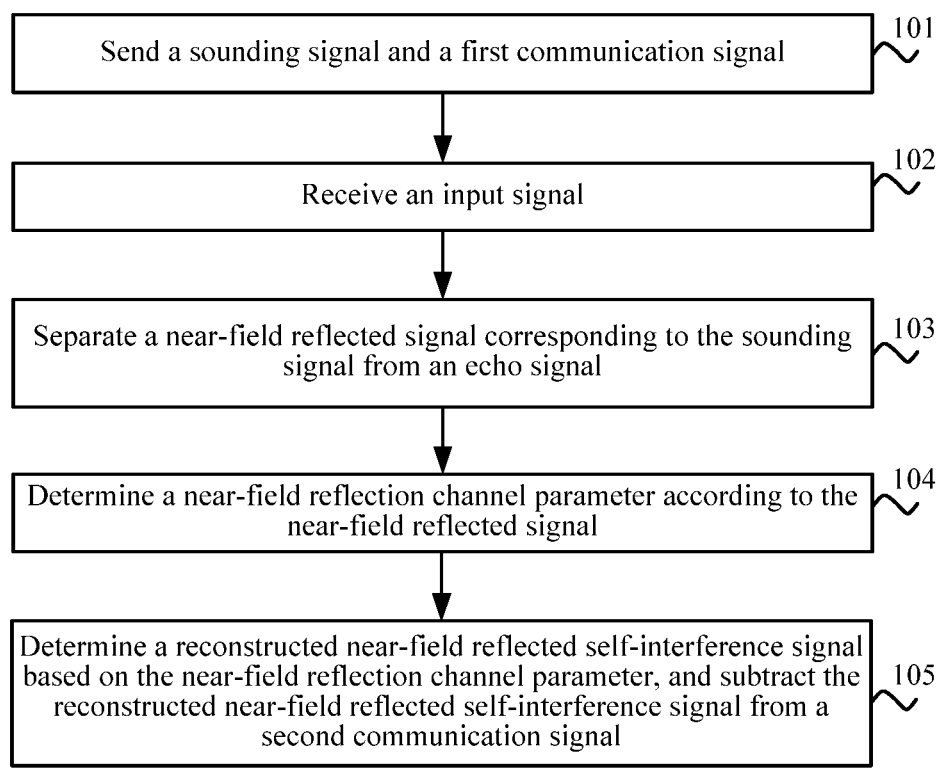
FIG. 1 is a schematic flowchart of a method for reducing a self-interference signal in a communications system according to an embodiment.

FIG. 1 is a schematic flowchart of a method for reducing a self-interference signal in a communications system according to an embodiment. The method shown in FIG. 1 is performed by an apparatus supporting wireless full duplex, and the apparatus may be located in a communications node such as user equipment and a base station.

101: Send a sounding signal and a first communication signal, where the sounding signal is sent in a manner of being superimposed on the first communication signal, and a power used to send the sounding signal is less than a power used to send the first communication signal.

102: Receive an input signal, where the input signal includes a second communication signal and an echo signal, the echo signal includes a near-field reflected signal corresponding to the sounding signal, and the second communication signal is sent by another apparatus.

103: Separate the near-field reflected signal corresponding to the sounding signal from the echo signal.

104: Determine a near-field reflection channel parameter according to the near-field reflected signal.

105: Determine a reconstructed near-field reflected self-interference signal based on the near-field reflection channel parameter, and subtract the reconstructed near-field reflected self-interference signal from the second communication signal.

According to the method shown in FIG. 1, a near-field reflection channel parameter used to reconstruct a near-field self-interference signal can be determined, a reconstructed near-field reflected self-interference signal is determined by using the near-field reflection channel parameter, and the reconstructed near-field reflected self-interference signal is subtracted from a near-field reflected self-interference signal in a received second communication signal. According to the method shown in FIG. 1, a near-field reflected signal can be effectively recognized and reconstructed, and near-field reflected self-interference signals in received signals can be reduced.

Figure 2:
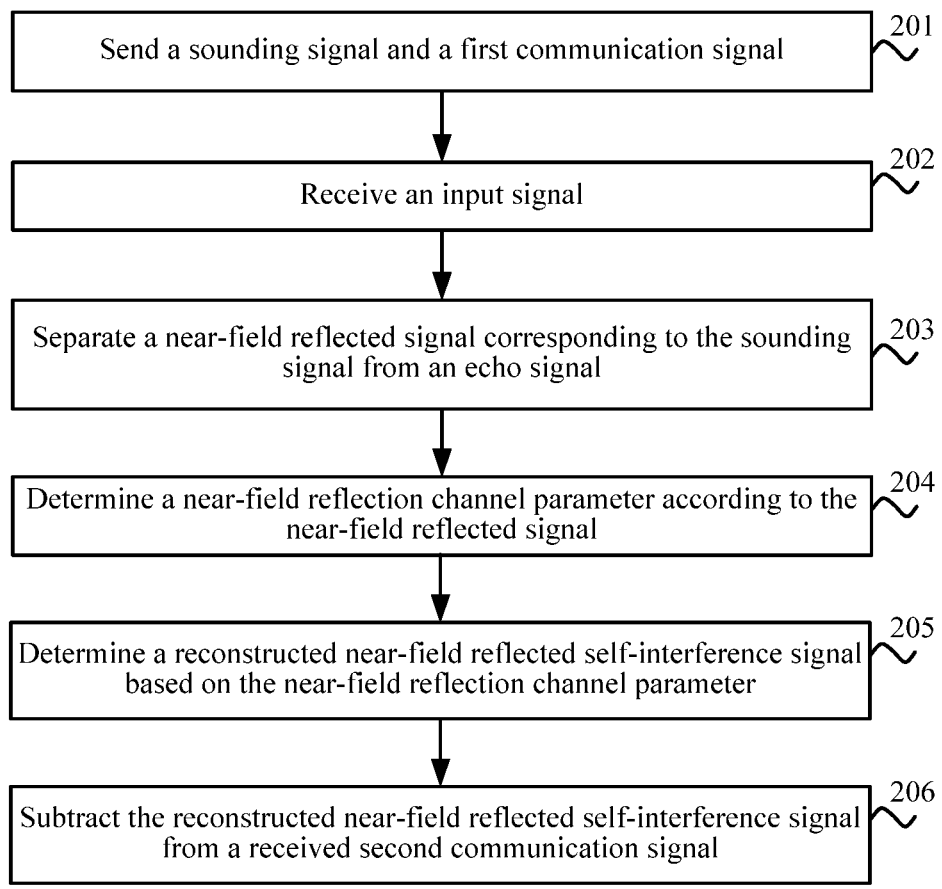
FIG. 2 is a schematic flowchart of a method for reducing a self-interference signal in a communications system according to an embodiment.

FIG. 2 is a schematic flowchart of a method for reducing a self-interference signal in a communications system according to an embodiment of the present invention. The embodiment in FIG. 2 is a specific embodiment of the method shown in FIG. 1.

201: Send a sounding signal and a first communication signal, where the sounding signal is sent in a manner of being superimposed on the first communication signal.

Specifically, a communications node (first communications node for short below) that includes an apparatus supporting wireless full duplex communicates with another communications node. A signal that is generated by the first communications node and used for communicating with another communications node is referred to as a first communication signal, and the first communication signal includes all information, such as data information and control information, used for communicating with another communications node. In addition to generating the first communication signal, the first communications node further generates a sounding signal, and the sounding signal is used for measuring a near-field reflection channel parameter.

The apparatus sends the sounding signal in a transmit timeslot in a sounding timeslot $T_1$, and stops sending the sounding signal in an idle timeslot in the sounding timeslot, where the idle timeslot includes a first silent timeslot $\delta_1$ and a second silent timeslot $\delta_2$. Specifically, a sounding signal with a bandwidth of B and a time length of T is sent in the transmit timeslot in $T_1$, and the sounding signal is a large time-bandwidth product signal, where TB>>1. A typical large time-bandwidth product ("time-bandwidth product" for short) signal used for the sounding signal may be linear frequency modulation signal, non-linear frequency modulation signal, or the like. Usually, to reduce out-of-band emission, the sounding signal may also be a large time-bandwidth product signal that is obtained after windowing, where a typical window function used for windowing may be a Hamming window, a Hanning window, a Tayler window, or the like. Then, the apparatus remains silent in the idle timeslot, and does not send any signal in this period, so that the apparatus can perform echo detection. Optionally, duration of the first silent timeslot $\delta_1$ in the idle timeslot may be equal to a maximum multi-path delay of a near-field reflection channel, a value of the second silent timeslot $\delta_2$ in the idle timeslot enables a delay of an echo multi-path component to exceed a sum of the duration of the first silent timeslot and duration of the second silent timeslot, and a power of the echo multi-path component is less than a preset threshold. Therefore, the sounding signal does not cause interference to detection on a sounding signal in a next sounding timeslot, where typically $\delta_2=3\delta_1\sim4\delta_1$. Because the sounding signal is sent in a manner of being superimposed on the first communication signal, stopping sending the sounding signal in the idle timeslot by a transmitter of the apparatus does not affect sending the first communication signal by the transmitter of the apparatus. In addition, the sounding signal is only used to estimate a near-field reflection channel, and therefore $\delta_1<<T$. Further, a power used to send the sounding signal is less than a power used to send the first communication signal. Typically, when a transmit power of the sounding signal is less than a transmit power of the first communication signal by more than 20 dB, interference from the sounding signal to transmission of a communications opposite end may be ignored.

Figure 3:
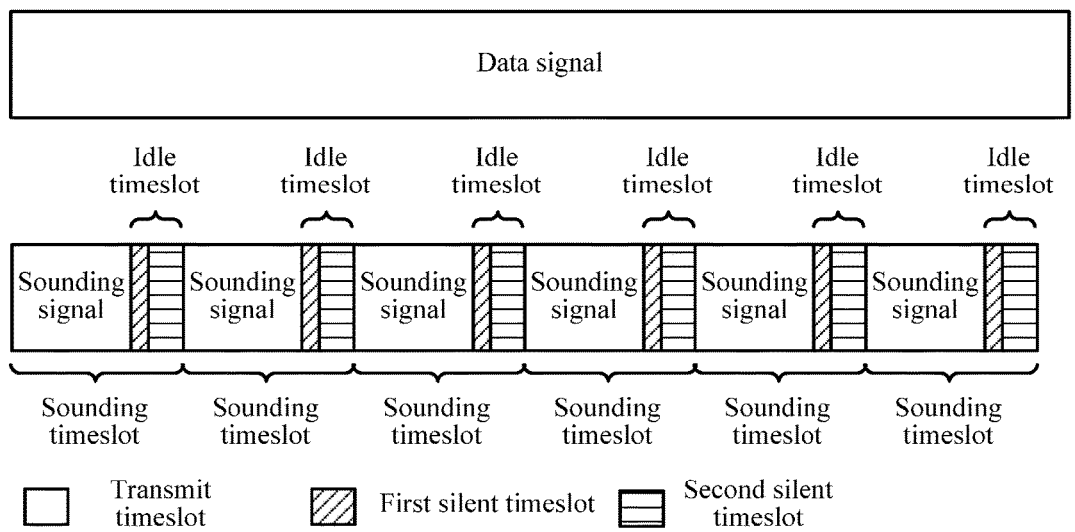
FIG. 3 is a schematic diagram of a timeslot structure according to an embodiment.

Optionally, in an embodiment, the apparatus may send the sounding signal by using a timeslot structure shown in FIG. 3, that is, the sounding timeslot is continuously sent.

Figure 4:
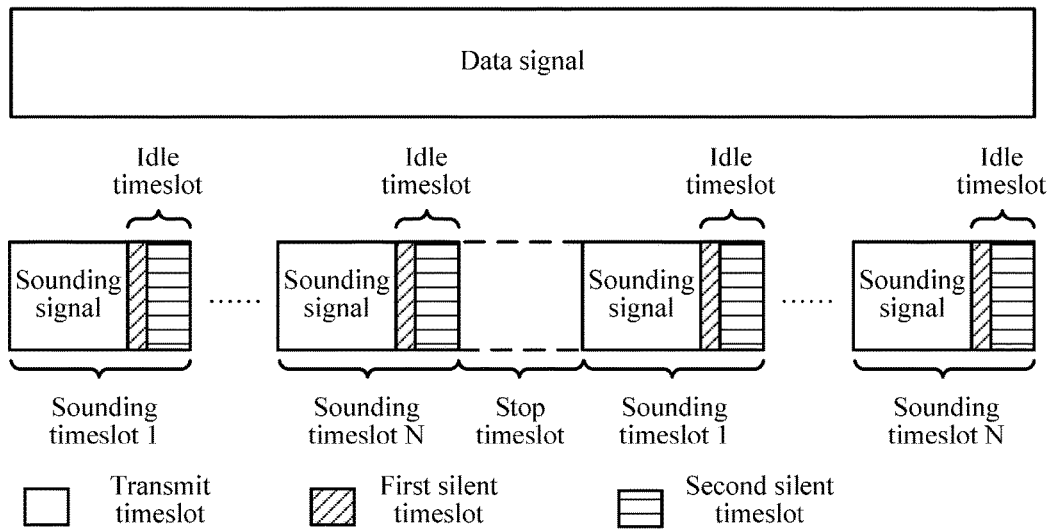
FIG. 4 is a schematic diagram of another timeslot structure according to an embodiment.

Optionally, in another embodiment, the apparatus may send the sounding signal by using a timeslot structure shown in FIG. 4, that is, send the sounding signal in a transmit timeslot in N consecutive sounding timeslots, and the transmitter of the apparatus stops sending the sounding signal in a stop timeslot, and then, sends the sounding signal again in N consecutive sounding timeslots, where N is a positive integer greater than or equal to 2. Because the sounding signal is superimposed on the first communication signal, stopping sending the sounding signal does not affect sending the first communication signal by the transmitter of the apparatus. When the timeslot structure shown in FIG. 3 or FIG. 4 is used, it may be that $\delta_2=3\delta_1\sim4\delta_1$, for example, $\delta_2=1.6$ μs.

Figure 5:
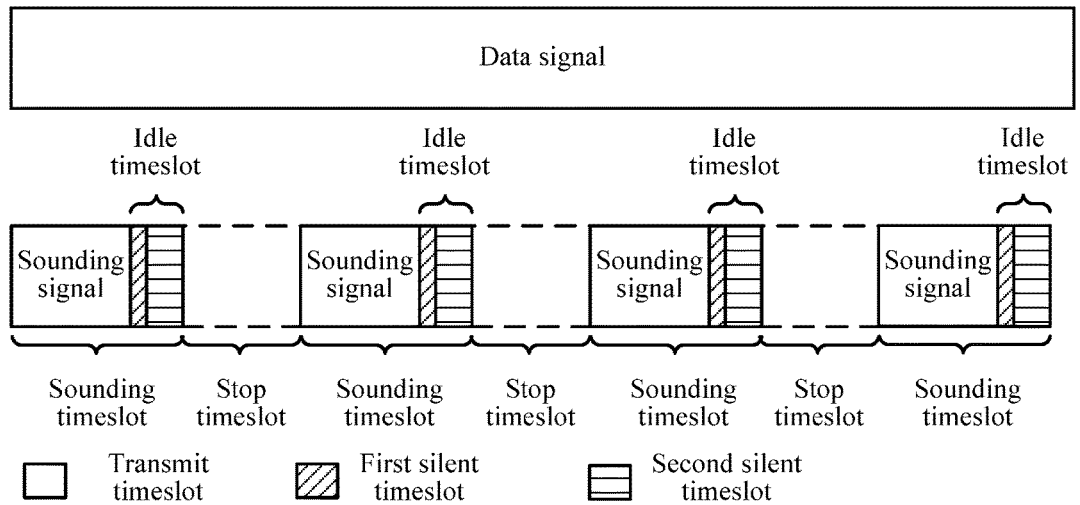
FIG. 5 is a schematic diagram of another timeslot structure according to an embodiment.

Optionally, in another embodiment, the apparatus may send the sounding signal by using a timeslot structure shown in FIG. 5, that is, send a sounding signal in a sounding timeslot, and the transmitter of the apparatus stops sending the sounding signal in a stop timeslot, and then, sends the sounding signal again in a sounding timeslot. When the sounding signal is sent by using the timeslot structure shown in FIG. 5, if a time of the stop timeslot is long, a value of $\delta_2$ may be 0. For example, when a near-field reflection channel within a radius of 60 m of the apparatus is considered, it may be that $\delta_1=400$ ns, and $\delta_2=0$ ns. A stop timeslot for stopping sending the sounding signal is added to a timeslot shown in FIG. 5, so that a timeslot for stopping sending the sounding signal is prolonged. In this way, efficiency of detecting a near-field reflection channel can be improved, and interference to a communication signal can be reduced as much as possible.

Optionally, in an embodiment, a bandwidth used to send the sounding signal by the apparatus may be equal to a bandwidth used to send the first communication signal. For example, a bandwidth of a communication channel on which the first communication signal is located is 20 MHz, and the first communication signal is in 2.44 GHz to 2.46 GHz, and has a central frequency of 2.45 GHz; the sounding signal is located in a same frequency band, uses a linear frequency modulation signal having a large time-bandwidth product TB=80, where a bandwidth B=20 MHz, and T=4 μs. In this case, if the timeslot structure shown in FIG. 3 or FIG. 4 is used, the sounding timeslot $T_1$ may be equal to 6 μs.

Optionally, in another embodiment, a bandwidth used to send the sounding signal by the apparatus may be greater than the bandwidth used to send the first communication signal. For example, a bandwidth of a communication channel on which the first communication signal is located is 20 MHz, and a bandwidth B of the sounding signal is 80 MHz. In this way, the apparatus may recognize a multi-path delay of 12 ns. In this case, even though the bandwidth of the sounding signal is greater than the bandwidth of the first communication signal, the sounding signal and the first communication signal are in a same frequency band, it may still be ensured that a wireless channel parameter measured by using the sounding signal is approximately the same as a channel parameter of the communication channel on which the first communication signal is located. For another example, a bandwidth of the first communication signal is 20 MHz, and the first communication signal is in 2.44 GHz to 2.46 GHz, and has a central frequency of 2.45 GHz; the sounding signal uses a non-linear frequency modulation signal in a Hanning window and having a time-bandwidth product TB of 160. In this case, if the timeslot structure shown in FIG. 3 or FIG. 4 is used, the sounding timeslot $T_1$ may be equal to 4 μs.

Optionally, in an embodiment, when the apparatus supports multiple-input multiple-output (MIMO), the apparatus separately sends the sounding signal by using multiple antennas, and separately receives an input signal by using the multiple antennas, where transmit timeslots in which the multiple antennas transmit the sounding signal are mutually staggered. That is, at any moment, only one branch transmits the sounding signal and receives an echo signal of the sounding signal. In this way, branches do not interfere with each other. Therefore, all antennas can share one sounding signal. In this case, if sounding timeslots of near-field reflection channels of branches are separated by $\delta_3$, where $\delta_3 \geq 0$, a value of a second silent timeslot $\delta_2$ in a sounding timeslot of a near-field reflection channel of each branch enables a power of an echo multi-path component of a sounding signal whose delay exceeds $\delta_1+\delta_2+\delta_3$ to be low enough, so that the sounding signal does not interfere with detection on a near-field reflected echo signal in a sounding timeslot of a near-field reflection channel of another subsequent branch.

Optionally, in an embodiment, for an adjacent apparatus supporting wireless full duplex, a transmit timeslot in which the apparatus sends the sounding signal and a transmit timeslot in which an adjacent (for example, at a distance of several meters to tens of meters) apparatus supporting wireless full duplex sends the sounding signal are mutually staggered. In other words, sounding timeslots of near-field reflection channels of a communications node A and a communications node B that are adjacent to each other are mutually staggered, and when either node transmits a sounding signal and receives an echo signal, a transmitter of the other communications node does not transmit the sounding signal. If sounding timeslots of near-field reflection channels of branches are separated by $\delta_3$, where $\delta_3 \geq 0$, a value of a second silent timeslot $\delta_2$ in a sounding timeslot of a near-field reflection channel of each node enables a power of an echo multi-path component of a sounding signal whose delay exceeds $\delta_1+\delta_2+\delta_3$ to be low enough, so that the sounding signal causes no interference to detection on a near-field reflected echo signal in a sounding timeslot of a near-field reflection channel of another subsequent node.

Optionally, in another embodiment, it is assumed that there are k communications nodes that are separated by a short distance, and a sounding signal between the k communications nodes may be interfered with. An average quantity of near-field reflected signals that correspond to the sounding signal and are accumulated by each communications node in the k communications nodes within a coherent accumulation time $T_n$ for detecting the echo signal is m, and each communications node in the k communications nodes can randomly allocate m sounding timeslots in $T_n \geq mkT_1$. In this way, for each communications node in the k communications nodes, near-field reflected signals in m sounding timeslots of each communications node are coherently accumulated, and a sounding timeslot of another communications node appears randomly. Because in multiple random signals, some are positive, and some are negative, the multiple random signals may cancel each other in an accumulation process, which therefore effectively lowers mutual interference of sounding signals between communications nodes that are separated by a short distance. In this embodiment, arc coordination between communications nodes or centralized allocation by a system is not needed, which lowers complexity of the system.

202: Receive an input signal, where the input signal includes a second communication signal and an echo signal, the echo signal includes a near-field reflected signal corresponding to the sounding signal and a data reflected signal corresponding to the first communication signal, and the second communication signal is a communication signal sent by another apparatus to a first communications node.

203: Separate the near-field reflected signal corresponding to the sounding signal from the echo signal.

Specifically, the near-field reflected signal is distinguished based on time according to a timeslot structure of the sounding signal.

204: Determine a near-field reflection channel parameter according to the near-field reflected signal.

Optionally, in an embodiment, when a bandwidth used to send the sounding signal by the apparatus is greater than the bandwidth used to send the first communication signal, the near-field reflection channel parameter may be calculated by using matched filtering.

Optionally, in another embodiment, the apparatus may further determine the near-field reflection channel parameter by using a coherent accumulation method. Specifically, the apparatus may perform matched filtering on multiple near-field reflected signals, to obtain multiple filtered near-field reflected signals, determine an average value of the multiple filtered near-field reflected signals, and determine the near-field reflection channel parameter according to the average value of the multiple filtered near-field reflected signals. Alternatively, the apparatus may determine an average near-field reflected signal corresponding to multiple near-field reflected signals (that is, obtain an average value of the multiple near-field reflected signals), perform matched filtering on the average near-field reflected signal, to obtain a filtered average near-field reflected signal, and determine the near-field reflection channel parameter according to the filtered average near-field reflected signal.

Optionally, in another embodiment, when a bandwidth used to send the sounding signal by the apparatus is equal to the bandwidth used to send the first communication signal, the near-field reflected signal may be sampled, and the near-field reflection channel parameter is determined by using a super-resolution delay algorithm according to a sampling result, where a typical super-resolution delay algorithm includes: maximum likelihood estimation, high-resolution direction-of-arrival estimation algorithm based on array signal processing, matching pursuit, orthogonal matching pursuit, and the like.

205: Determine a reconstructed near-field reflected self-interference signal based on the near-field reflection channel parameter.

Specifically, the reconstructed near-field reflected self-interference signal may be determined by using the following formula:

$$y(t)=x(t)*h(t), \qquad 1.1$$

where, y(t) represents a reconstructed near-field reflected self-interference signal, x(t) represents a reconstructed reference signal, h(t) represents a near-field reflection channel parameter, a symbol "*" represents a convolution, and the reconstructed reference signal is known. Therefore, when the near-field reflection channel parameter is determined, the reconstructed near-field reflected self-interference signal may be determined by using the formula 1.1.

206: Subtract the reconstructed near-field reflected self-interference signal from the received second communication signal, where the second communication signal is sent by another apparatus.

According to the method shown in FIG. 2, a near-field reflection channel parameter used to reconstruct a near-field self-interference signal can be determined, a reconstructed near-field reflected self-interference signal is determined by using the near-field reflection channel parameter, and the reconstructed near-field reflected self-interference signal is subtracted from a near-field reflected self-interference signal of a received second communication signal. According to the method shown in FIG. 1, a near-field reflected signal can be effectively recognized and reconstructed, and near-field reflected self-interference signals in received signals can be reduced.

FIG. 3 is a schematic diagram of a timeslot structure according to an embodiment. As shown in FIG. 3, a sounding signal is superimposed on a first communication signal, and sounding timeslots are consecutive.

FIG. 4 is a schematic diagram of another timeslot structure according to an embodiment of the present invention. As shown in FIG. 4, a sounding signal is superimposed on a first communication signal, and N sounding timeslots and one stop timeslot appear alternately, where N is a positive integer greater than or equal to 2.

FIG. 5 is a schematic diagram of another timeslot structure according to an embodiment of the present invention. As shown in FIG. 5, a sounding signal is sent in a manner of being superimposed on a first communication signal, and a sounding timeslot and a stop timeslot appear alternately.

Figure 6:
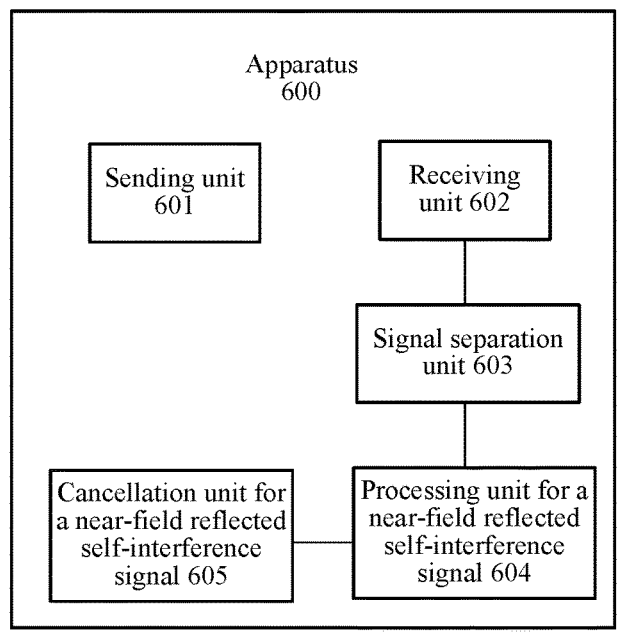
FIG. 6 is a structural block diagram of an apparatus according to an embodiment.

FIG. 6 is a structural block diagram of an apparatus according to an embodiment. An apparatus 600 shown in FIG. 6 is an apparatus supporting wireless full duplex, and can perform steps in FIG. 1 or FIG. 2. As described in FIG. 6, the apparatus 600 includes: a sending unit 601, a receiving unit 602, a signal separation unit 603, and a processing unit 604 for a near-field reflected self-interference signal.

The sending unit 601 is configured to send a sounding signal and a first communication signal, where the sounding signal is sent in a manner of being superimposed on the first communication signal, and a power used to send the sounding signal is less than a power used to send the first communication signal.

The receiving unit 602 is configured to receive an echo signal, where the echo signal includes a near-field reflected signal corresponding to the sounding signal.

The signal separation unit 603 is configured to separate the near-field reflected signal from the echo signal.

The processing unit 604 for a near-field reflected self-interference signal is configured to determine a near-field reflection channel parameter according to the near-field reflected signal.

A cancellation unit 605 for a near-field reflected self-interference signal is configured to determine a reconstructed near-field reflected self-interference signal based on the near-field reflection channel parameter, and subtract the reconstructed near-field reflected self-interference signal from a second communication signal.

The apparatus 600 shown in FIG. 6 can determine the near-field reflection channel parameter used to reconstructing the near-field self-interference signal, so as to achieve an objective of preparing for further cancelling the near-field self-interference signal.

Further, the sending unit 601 is specifically configured to send the sounding signal in a transmit timeslot in a sounding timeslot, and stop sending the sounding signal in an idle timeslot in the sounding timeslot, where the idle timeslot includes a first silent timeslot and a second silent timeslot.

Further, the sending unit 601 is specifically configured to send the sounding signal by using a bandwidth that is greater than or equal to a bandwidth used to send the first communication signal.

Optionally, in an embodiment, when the sending unit 601 sends the sounding signal by using a bandwidth that is greater than the bandwidth used to send the first communication signal, the processing unit 604 for a near-field reflected self-interference signal is specifically configured to perform matched filtering on the near-field reflected signal, to obtain a filtered near-field reflected signal, and determine the near-field reflection channel parameter according to the filtered near-field reflected signal.

Optionally, in another embodiment, when the sending unit 601 sends the sounding signal by using a bandwidth that is greater than the bandwidth used to send the first communication signal, the processing unit 604 for a near-field reflected self-interference signal is specifically configured to perform matched filtering on multiple near-field reflected signals, to obtain multiple filtered near-field reflected signals, determine an average value of the multiple filtered near-field reflected signals, and determine the near-field reflection channel parameter according to the average value of the multiple filtered near-field reflected signals. Alternatively, the processing unit 604 for a near-field reflected self-interference signal is specifically configured to determine an average near-field reflected signal corresponding to multiple near-field reflected signals, perform matched filtering on the average near-field reflected signal, to obtain a filtered average near-field reflected signal, and determine the near-field reflection channel parameter according to the filtered average near-field reflected signal.

Optionally, in another embodiment, when the sending unit 601 sends the sounding signal by using a bandwidth that is equal to the bandwidth used to send the first communication signal, the processing unit 604 for a near-field reflected self-interference signal is specifically configured to determine the near-field reflection channel parameter by using a super-resolution delay algorithm.

Further, when the apparatus 600 supports multiple-input multiple-output MIMO, the sending unit 601 is specifically configured to separately send the sounding signal by using multiple antennas of the apparatus, where timeslots in which the multiple antennas separately send the sounding signal are mutually staggered.

Further, the sending unit 601 is specifically configured to mutually stagger a timeslot in which the sounding signal is sent and a timeslot in which an adjacent apparatus supporting wireless full duplex sends a sounding signal.

Further, the sending unit 601 is specifically configured to send the sounding signal by using M random sounding timeslots, where M is an average quantity of near-field reflected signals that correspond to the sounding signal and are accumulated by the apparatus supporting wireless full duplex within a coherent accumulation time for receiving the echo signal.

Figure 7:
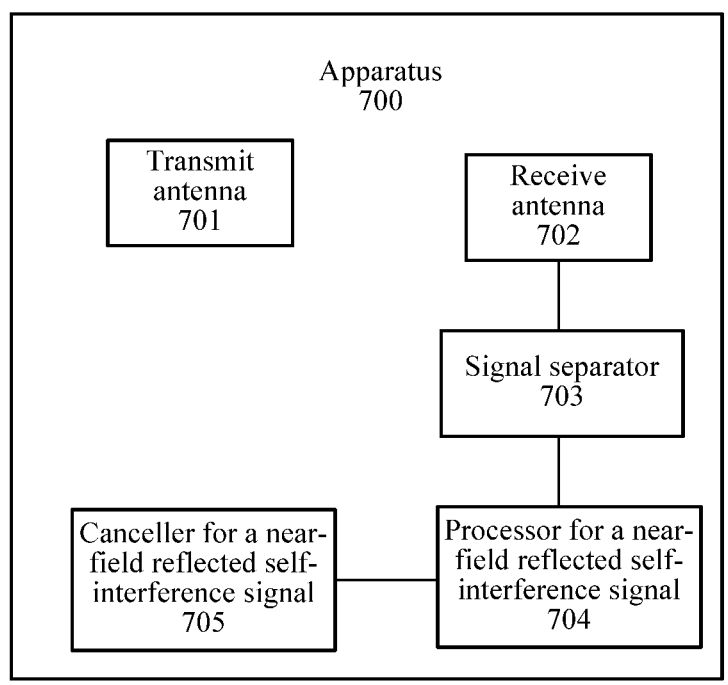
FIG. 7 is a structural block diagram of an apparatus according to an embodiment.

FIG. 7 is a structural block diagram of an apparatus according to an embodiment. An apparatus 700 shown in FIG. 7 is an apparatus supporting wireless full duplex, and can perform steps in FIG. 1 or FIG. 2. As described in FIG. 7, the apparatus 700 includes: a transmit antenna 701, a receive antenna 702, a signal separator 703, and a processor 704 for a near-field reflected self-interference signal.

The transmit antenna 701 is configured to send a sounding signal and a first communication signal, where the sounding signal is sent in a manner of being superimposed on the first communication signal, and a power used to send the sounding signal is less than a power used to send the first communication signal.

The receive antenna 702 is configured to receive an echo signal, where the echo signal includes a near-field reflected signal corresponding to the sounding signal.

The signal separator 703 is configured to separate the near-field reflected signal from the echo signal.

The processor 704 for a near-field reflected self-interference signal is configured to determine a near-field reflection channel parameter according to the near-field reflected signal.

A canceller 705 for a near-field reflected self-interference signal is configured to determine a reconstructed near-field reflected self-interference signal based on the near-field reflection channel parameter, and subtract the reconstructed near-field reflected self-interference signal from a second communication signal.

The apparatus 700 shown in FIG. 7 can determine the near-field reflection channel parameter used to reconstructing the near-field self-interference signal, so as to achieve an objective of preparing for further cancelling the near-field self-interference signal.

Further, the transmit antenna 701 is specifically configured to send the sounding signal in a transmit timeslot in a sounding timeslot, and stop sending the sounding signal in an idle timeslot in the sounding timeslot, where the idle timeslot includes a first silent timeslot and a second silent timeslot.

Further, the transmit antenna 701 is specifically configured to send the sounding signal by using a bandwidth that is greater than or equal to a bandwidth used to send the first communication signal.

Optionally, in an embodiment, when the transmit antenna 701 sends the sounding signal by using a bandwidth that is greater than the bandwidth used to send the first communication signal, the processor 704 for a near-field reflected self-interference signal is specifically configured to perform matched filtering on the near-field reflected signal, to obtain a filtered near-field reflected signal, and determine the near-field reflection channel parameter according to the filtered near-field reflected signal.

Optionally, in another embodiment, when the transmit antenna 701 sends the sounding signal by using a bandwidth that is greater than the bandwidth used to send the first communication signal, the processor 704 for a near-field reflected self-interference signal is specifically configured to perform matched filtering on multiple near-field reflected signals, to obtain multiple filtered near-field reflected signals, determine an average value of the multiple filtered near-field reflected signals, and determine the near-field reflection channel parameter according to the average value of the multiple filtered near-field reflected signals. Alternatively, the processor 704 for a near-field reflected self-interference signal is specifically configured to determine an average near-field reflected signal corresponding to multiple near-field reflected signals, perform matched filtering on the average near-field reflected signal, to obtain a filtered average near-field reflected signal, and determine the near-field reflection channel parameter according to the filtered average near-field reflected signal.

Optionally, in another embodiment, when the transmit antenna 701 sends the sounding signal by using a bandwidth that is equal to the bandwidth used to send the first communication signal, the processor 704 for a near-field reflected self-interference signal is specifically configured to determine the near-field reflection channel parameter by using a super-resolution delay algorithm.

Further, when the apparatus 700 supports multiple-input multiple-output MIMO, the transmit antenna 701 is specifically configured to separately send the sounding signal by using multiple antennas of the apparatus, where timeslots in which the multiple antennas separately send the sounding signal are mutually staggered.

Further, the transmit antenna 701 is specifically configured to mutually stagger a timeslot in which the sounding signal is sent and a timeslot in which an adjacent apparatus supporting wireless full duplex sends a sounding signal.

Further, the transmit antenna 701 is specifically configured to send the sounding signal by using M random sounding timeslots, where M is an average quantity of near-field reflected signals that correspond to the sounding signal and are accumulated by the apparatus supporting wireless full duplex within a coherent accumulation time for receiving the echo signal.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or accumulated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be accumulated into one processing unit, or each of the units may exist alone physically, or two or more units are accumulated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium and includes several instructions for instructing a computer device (which may be a personal computer, a server, or a network device) or a processor (processor) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus, wherein the apparatus comprises:
a sending unit, configured to send a sounding signal and a first communication signal, wherein the sounding signal is superimposed on the first communication signal during the sending of the sounding signal, a power used to send the sounding signal is less than a power used to send the first communication signal, wherein the sending unit is configured to send the sounding signal in a transmit timeslot, the transmit timeslot being comprised in a sounding timeslot, and the sending unit is configured to stop sending the sounding signal in an idle timeslot, the idle timeslot being comprised in the sounding timeslot, and wherein the idle timeslot comprises a first silent timeslot and a second silent timeslot;
a receiving unit, configured to receive an input signal, wherein the input signal comprises an echo signal and a second communication signal sent by another apparatus, and the echo signal comprises a near-field reflected signal corresponding to the sounding signal;
a signal separation unit, configured to separate the near-field reflected signal from the echo signal;
a processing unit, configured to determine a near-field reflection channel parameter according to the near-field reflected signal; and
a cancellation unit, configured to determine a reconstructed near-field reflected self-interference signal based on the near-field reflection channel parameter, and subtract the reconstructed near-field reflected self-interference signal from the second communication signal.

2. The apparatus according to claim 1, wherein the sending unit is configured to send the sounding signal using a bandwidth that is greater than or equal to a bandwidth used to send the first communication signal.

3. The apparatus according to claim 2, wherein the processing unit is configured to, when the sending unit sends the sounding signal using the bandwidth that is greater than the bandwidth used to send the first communication signal, perform matched filtering on the near-field reflected signal, to obtain a filtered near-field reflected signal, and determine the near-field reflection channel parameter according to the filtered near-field reflected signal.

4. The apparatus according to claim 2, wherein the processing unit is configured to, when the sending unit sends the sounding signal using the bandwidth that is greater than the bandwidth used to send the first communication signal, perform the following:
perform matched filtering on multiple near-field reflected signals, to obtain multiple filtered near-field reflected signals, determine an average value of the multiple filtered near-field reflected signals, and determine the near-field reflection channel parameter according to the average value of the multiple filtered near-field reflected signals; or
determine an average near-field reflected signal corresponding to multiple near-field reflected signals, perform matched filtering on the average near-field reflected signal, to obtain a filtered average near-field reflected signal, and determine the near-field reflection channel parameter according to the filtered average near-field reflected signal.

5. The apparatus according to claim 2, wherein the processing unit is configured to, when the sending unit sends the sounding signal using a bandwidth that is equal to the bandwidth used to send the first communication signal, determine the near-field reflection channel parameter using a super-resolution delay algorithm.

6. The apparatus according to claim 1, wherein the apparatus supports multiple-input multiple-output (MIMO), and the sending unit is configured to separately send the sounding signal using multiple antennas of the apparatus, wherein timeslots in which the multiple antennas separately send the sounding signal are mutually staggered.

7. The apparatus according to claim 1, wherein the sending unit is configured to send the sounding signal using a timeslot that is staggered with a timeslot used for sending a sounding signal by an adjacent apparatus supporting wireless full duplex.

8. The apparatus according to claim 1, wherein the sending unit is configured to send the sounding signal using M random sounding timeslots, wherein M is an average quantity of near-field reflected signals that correspond to the sounding signal and are accumulated by the apparatus supporting wireless full duplex within a coherent accumulation time for receiving the echo signal.

9. An apparatus, wherein the apparatus comprises:
a transmit antenna, configured to send a sounding signal and a first communication signal, wherein the sounding signal is superimposed on the first communication signal during the sending of the sounding signal, and a power used to send the sounding signal is less than a power used to send the first communication signal, wherein the transmit antenna is configured to send the sounding signal in a transmit timeslot, the transmit timeslot being comprised in a sounding timeslot, and the transmit antenna is configured to stop sending the sounding signal in an idle timeslot, the idle timeslot being comprised in the sounding timeslot, wherein the idle timeslot comprises a first silent timeslot and a second silent timeslot;
a receive antenna, configured to receive an echo signal, wherein the echo signal comprises a near-field reflected signal corresponding to the sounding signal;
a signal separator, configured to separate the near-field reflected signal from the echo signal;
a processor, configured to determine a near-field reflection channel parameter according to the near-field reflected signal; and
a canceller, configured to determine a reconstructed near-field reflected self-interference signal based on the near-field reflection channel parameter, and subtract the reconstructed near-field reflected self-interference signal from a second communication signal.

10. The apparatus according to claim 9, wherein the transmit antenna is configured to send the sounding signal using a bandwidth that is greater than or equal to a bandwidth used to send the first communication signal.

11. The apparatus according to claim 10, wherein the processor is configured to, when the transmit antenna sends the sounding signal using the bandwidth that is greater than the bandwidth used to send the first communication signal, perform matched filtering on the near-field reflected signal, to obtain a filtered near-field reflected signal, and determine the near-field reflection channel parameter according to the filtered near-field reflected signal.

12. The apparatus according to claim 10, wherein the processor is configured to, when the transmit antenna sends the sounding signal using the bandwidth that is greater than the bandwidth used to send the first communication signal, perform the following:
perform matched filtering on multiple near-field reflected signals, to obtain multiple filtered near-field reflected signals, determine an average value of the multiple filtered near-field reflected signals, and determine the near-field reflection channel parameter according to the average value of the multiple filtered near-field reflected signals; or
determine an average near-field reflected signal corresponding to multiple near-field reflected signals, perform matched filtering on the average near-field reflected signal, to obtain a filtered average near-field reflected signal, and determine the near-field reflection channel parameter according to the filtered average near-field reflected signal.

13. A method, comprising:
sending, by an apparatus, a sounding signal and a first communication signal, wherein the sounding signal is superimposed on the first communication signal during the sending of the sounding signal, and a power used to send the sounding signal is less than a power used to send the first communication signal, wherein the apparatus supports wireless full duplex, and wherein sending the sounding signal comprises:
 transmitting the sounding signal in a transmit timeslot, the transmit timeslot being comprised in a sounding timeslot; and
 stopping transmitting the sounding signal in an idle timeslot, the idle timeslot being comprised in the sounding timeslot, wherein the idle timeslot comprises a first silent timeslot and a second silent timeslot;
receiving, by the apparatus, an input signal, wherein the input signal comprises an echo signal and a second communication signal received from another apparatus, and the echo signal comprises a near-field reflected signal corresponding to the sounding signal;
separating, by the apparatus, the near-field reflected signal from the echo signal;
determining, by the apparatus, a near-field reflection channel parameter according to the near-field reflected signal; and
determining, by the apparatus, a reconstructed near-field reflected self-interference signal based on the near-field reflection channel parameter, and subtracting the reconstructed near-field reflected self-interference signal from the second communication signal.

14. The method according to claim 13, wherein duration of the first silent timeslot is equal to a maximum multi-path delay of a near-field reflection channel, a value of the second silent timeslot enables a delay of an echo multi-path component to exceed a sum of the duration of the first silent timeslot and duration of the second silent timeslot, and a power of the echo multi-path component is less than a preset threshold.

15. The method according to claim 13, wherein sending the sounding signal and the first communication signal comprises:
sending the sounding signal using a bandwidth that is greater than or equal to a bandwidth used to send the first communication signal.

16. The method according to claim 15, wherein, when the bandwidth used to send the sounding signal is greater than the bandwidth used to send the first communication signal, determining the near-field reflection channel parameter according to the near-field reflected signal comprises:
performing matched filtering on the near-field reflected signal, to obtain a filtered near-field reflected signal, and determining the near-field reflection channel parameter according to the filtered near-field reflected signal.

17. The method according to claim 15, wherein, when the bandwidth used to send the sounding signal is greater than the bandwidth used to send the first communication signal, determining the near-field reflection channel parameter according to the near-field reflected signal comprises:
performing matched filtering on multiple near-field reflected signals, to obtain multiple filtered near-field reflected signals, determining an average value of the multiple filtered near-field reflected signals, and determining the near-field reflection channel parameter according to the average value of the multiple filtered near-field reflected signals; or
determining an average near-field reflected signal corresponding to multiple near-field reflected signals, performing matched filtering on the average near-field reflected signal, to obtain a filtered average near-field reflected signal, and determining the near-field reflection channel parameter according to the filtered average near-field reflected signal.

* * * * *